Patented June 7, 1927.

1,631,763

UNITED STATES PATENT OFFICE.

LOUIS ROUANET, OF IVRY-PORT, FRANCE, ASSIGNOR TO COMPAGNIE D'APPLICATIONS MECANIQUES, OF PARIS, FRANCE.

BEARING WITH ROLLING MEMBERS.

No Drawing. Application filed November 10, 1922, Serial No. 600,017, and in France December 12, 1921.

The invention has for its object a bearing which is susceptible of being used in any machinery operating in an acid medium wherein a bearing of the ordinary type would be attacked and oxidized.

The invention consists in a bearing in which the race members or rings are made of a material having a suitable degree of hardness while the rolling members (balls, rollers, discs, etc.) shall be of a different material having a greater degree of hardness, in order that during the operation of the bearing, the said rolling elements shall undergo no deformation. The bearing rings are preferably of bronze, alloys of bronze, non-oxidizable alloys or any other equivalent substance which is also non-oxidizable and not attacked by acids or by gas, whilst the balls, rollers, etc. constituting the rolling elements are of glass, porcelain, agate, artificial ruby or any other equivalent substance.

The invention more specifically consists in a bearing of the said type wherein the race rings are constructed of metal (aluminium bronze preferably) and wherein the rolling members are constructed of glass or porcelain, this bearing being particularly adapted to be used in good conditions, for the cylinders of machines for washing, bleaching and dyeing, for instance.

It is understood that the race rings of such bearings may be provided with any advantageous features already known in ordinary ball, roller or like bearings, such features relating for instance to the profile of the rings, devices for the introduction of the rolling members etc.

All types of cages in suitable material may also be employed.

Having now described my invention, what I claim as new and desire to secure by Letters Patent is:

A bearing adapted to be used in an acid or oxidizing medium, comprising concentric race members and rolling members disposed between said race members, the race members being made of aluminum bronze, and the rolling members being made of agate and the like material.

In testimony whereof I have signed my name to this specification.

LOUIS ROUANET.